US010110012B2

(12) United States Patent
Li et al.

(10) Patent No.: US 10,110,012 B2
(45) Date of Patent: Oct. 23, 2018

(54) MOBILE MICRO-GRID SYSTEM AND CONTROL METHOD THEREOF

(71) Applicant: CHUNG-HSIN ELECTRIC & MACHINERY MFG. CORPORATION, Taoyuan (TW)

(72) Inventors: Ting-Kuan Li, Taoyuan (TW);
Yen-Haw Chen, Taoyuan (TW);
Chun-Der Chang, Taoyuan (TW);
Wen-Chieh Wang, Taoyuan (TW);
Sung-Feng Tsai, Taoyuan (TW);
Cheng-Shan Lin, Taoyuan (TW);
Su-Ying Lu, Taoyuan (TW)

(73) Assignee: CHUNG-HSIN ELECTRIC & MACHINERY MFG. CORPORATION, Taoyuan (JP)

( * ) Notice: Subject to any disclaimer, the term of this patent is extended or adjusted under 35 U.S.C. 154(b) by 234 days.

(21) Appl. No.: 15/225,683

(22) Filed: Aug. 1, 2016

(65) Prior Publication Data
US 2017/0366011 A1    Dec. 21, 2017

(30) Foreign Application Priority Data

Jun. 15, 2016 (TW) .............................. 105118708 A

(51) Int. Cl.
*H02J 3/46* (2006.01)
*H02J 3/38* (2006.01)

(52) U.S. Cl.
CPC ............... *H02J 3/46* (2013.01); *H02J 3/383* (2013.01); *H02J 3/386* (2013.01); *H02J 3/387* (2013.01)

(58) Field of Classification Search
CPC .... H02J 3/46; H02J 3/387; H02J 3/383; H02J 3/386

USPC ........................................................ 327/23
See application file for complete search history.

(56) References Cited

U.S. PATENT DOCUMENTS

| 5,982,645 A * | 11/1999 | Levran ................ H01F 27/2866 307/66 |
| 8,964,423 B2 * | 2/2015 | Anghel ...................... H02J 3/26 363/35 |
| 9,973,107 B2 * | 5/2018 | Cerqueira Pinto Bezerra Varajao ................. H02M 5/297 |

FOREIGN PATENT DOCUMENTS

TW      201330440 A     7/2013

OTHER PUBLICATIONS

Taiwan Patent Office, Office Action, Patent Application Serial No. 105118708, dated Feb. 17, 2017, Taiwan.

* cited by examiner

*Primary Examiner* — Dinh T Le

(57) ABSTRACT

A system and a control method of a mobile micro-grid are provided. The mobile micro-grid system includes a renewable energy source and a non-renewable energy source which are in a container. The control method includes supplying the renewable energy source as a primary power supply to an external load; and determining whether the electricity of the renewable energy source is sufficient. If the electricity of the renewable energy source is sufficient, then the renewable energy source provides electricity to the external load; if the electricity of the renewable energy source is not sufficient, then the renewable energy source and non-renewable energy source provide electricity to the external load. If an external power source, which is a renewable-energy-type power source, is connected to the mobile micro-grid system, then the renewable energy source and external power source work as the primary power supply.

11 Claims, 8 Drawing Sheets

MOBILE MICRO-GRID SYSTEM AND CONTROL METHOD THEREOF

CROSS REFERENCE TO RELATED APPLICATIONS

This Application claims priority of Taiwan Patent Application No. 105118708, filed on Jun. 15, 2016, the entirety of which is incorporated by reference herein.

BACKGROUND OF THE INVENTION

Field of the Invention

The present invention relates to a micro-grid system, and in particular it relates to a mobile micro-grid system.

Description of the Related Art

Although there are some places that have a demand for electricity, the fixed-location micro-grid system is not appropriate for use in those places because of space limitations (e.g. there is no suitable place to build a power-generating system) or time constraints (e.g. temporary power needs, such as outdoor concerts). On the other hand, since the beginning of the impact of global warming, the demand for renewable energy has been growing. In modern energy development, using renewable energy sources (such as wind, solar, hydroelectric power, etc.) to replace the traditional energy sources generated from coal, gasoline, or diesel fuel has become a global trend in power-generation techniques.

In the situation mentioned above, there is a need for a mobile micro-grid system comprising a renewable energy source and having mobility to overcome the space and time limitations of generating power, which makes the application of the renewable energy source become further extended.

BRIEF SUMMARY OF THE INVENTION

A detailed description is given in the following embodiments with reference to the accompanying drawings.

According to an embodiment of the present invention, a mobile micro-grid system is provided. The mobile micro-grid system comprises a container, and the container comprises a first DC power system, a second DC power system, a three-phase AC power system, a single-phase AC power system, a bidirectional DC/DC converter, a three-phase AC/DC transformer device, a first port, sense circuits, a single-phase AC/DC transformer device, a second port, and a control circuit.

The first DC power system comprises a first DC bus, a first input port, a first sense circuit, a first switch circuit, a first output port, a second sense circuit, and a second switch circuit. The first DC bus delivers a first DC voltage. The first input port is selectively connected to a first external power source to receive electricity from the first external power source. The first sense circuit is connected to the first input port and provided to detect whether the first external power source is connected to the first input port and detect a voltage value of the first external power source if the first external power source is connected to the first input port. The first switch circuit is connected to the first DC bus and the first sense circuit. The first output port is selectively connected to a first external load to provide the first DC voltage to the first external load. The second sense circuit is connected to the first output port and provided to detect whether the first external load is connected to the first output port. The second switch circuit is connected to the first DC bus and the second sense circuit.

The second DC power system comprises a second DC bus, a second input port, a third sense circuit, a third switch circuit, a second output port, a fourth sense circuit, a fourth switch circuit, a renewable energy source, and an energy storage device. The second DC bus delivers a second DC voltage. The second input port is selectively connected to a second external power source to receive electricity from the second external power source. The third sense circuit is connected to the second input port and provided to detect whether the second external power source is connected to the second input port and detect a voltage value of the second external power source if the second external power source is connected to the second input port. The third switch circuit is connected to the second DC bus and the third sense circuit. The second output port is selectively connected to a second external load to provide the second DC voltage to the second external load. The fourth sense circuit is connected to the second output port and provided to detect whether the second external load is connected to the second output. The fourth switch circuit is connected to the second DC bus and the fourth sense circuit. The renewable energy source is coupled to the second DC bus through a fifth switch circuit. The energy storage device is coupled to the second DC bus through a sixth switch circuit.

The three-phase AC power system comprises a three-phase AC bus, a third input port, a fifth sense circuit, a seventh switch circuit, a third output port, a sixth sense circuit, and an eighth switch circuit. The three-phase AC bus delivers a three-phase AC voltage. The third input port is selectively connected to a third external power source to receive electricity from the third external power source. The fifth sense circuit is connected to the third input port and provided to detect whether the third external power source is connected to the third input port and detect a voltage value, phase, and frequency of an AC voltage of the third external power source if the third external power source is connected to the third input port. The seventh switch circuit is connected to the three-phase AC bus and the fifth sense circuit. The third output port is selectively connected to a third external load to provide the three-phase AC voltage to the third external load. The sixth sense circuit is connected to the third output port and provided to detect whether the third external load is connected to the third output port. The eighth switch circuit is connected to the three-phase AC bus and the sixth sense circuit.

The single-phase AC power system comprises a single-phase AC bus, a fourth input port, a seventh sense circuit, a ninth switch circuit, a fourth output port, an eighth sense circuit, and a tenth switch circuit. The single-phase AC bus delivers a single-phase AC voltage. The fourth input port is selectively connected to a fourth external power source to receive electricity from the fourth external power source. The seventh sense circuit is connected to the fourth input port and provided to detect whether the fourth external power source is connected to the fourth input port and detect a voltage value and frequency of an AC voltage of the fourth external power source if the fourth external power source is connected to the fourth input port. The ninth switch circuit is connected to the single-phase AC bus and the seventh sense circuit. The fourth output port is selectively connected to a fourth external load to provide the single-phase AC voltage to the fourth external load. The eighth sense circuit is connected to the fourth output port and provided to detect whether the fourth external load is connected to the fourth output port. The tenth switch circuit is connected to the single-phase AC bus and the eighth sense circuit.

The bidirectional DC/DC converter is coupled to the first DC bus through an eleventh switch circuit, coupled to the second DC bus through a twelfth switch circuit, and provided to make the first DC bus and the second DC bus provide DC electricity to each other based on a DC voltage conversion performed by the bidirectional DC/DC converter.

The three-phase AC/DC transformer device is coupled to the three-phase AC bus through a thirteenth switch circuit and coupled to the first DC bus through a fourteenth switch circuit. The first port is selectively connected to a three-phase AC grid. The ninth sense circuit is connected to the first port, coupled to the three-phase AC/DC transformer device through a fifteenth switch circuit, and provided to detect whether the three-phase AC grid is connected to the first port and detect a voltage value, phase, and frequency of an AC voltage of the three-phase AC grid if the three-phase AC grid is connected to the first port.

The single-phase AC/DC transformer device is coupled to the single-phase AC bus through a sixteenth switch circuit and coupled to the second DC bus through a seventeenth switch circuit. The second port is selectively connected to a single-phase AC grid. The tenth sense circuit is connected to the second port, coupled to the single-phase AC/DC transformer device through an eighteenth switch circuit, and provided to detect whether the single-phase AC grid is connected to the second port and detect a voltage value and frequency of an AC voltage of the single-phase AC grid if the single-phase AC grid is connected to the second port.

The control circuit is coupled to the first to eighteenth switch circuits, the first to tenth sense circuits, the first DC bus, the second DC bus, the three-phase AC bus, the single-phase AC bus, the bidirectional DC/DC convertor, the three-phase AC/DC transformer device, the single-phase AC/DC transformer device, the renewable energy source, and the energy storage device.

The control circuit separately receives detection results of the first to tenth sense circuits and detects voltage values of the first DC bus and the second DC bus, a voltage value, phase, and frequency of an AC voltage of the three-phase AC bus, and a voltage value and frequency of an AC voltage of the single-phase AC bus. On/off operations of the first to eighteenth switch circuits are separately controlled by the control circuit. Operations of the bidirectional DC/DC convertor, the three-phase AC/DC transformer device, the single-phase AC/DC transformer device, the renewable energy source, and the energy storage device are separately controlled by the control circuit. The three-phase AC/DC transformer device makes the three-phase AC bus, the first DC bus, and the three-phase AC grid able to provide electricity to each other. The single-phase AC/DC transformer device makes the single-phase AC bus, the second DC bus, and the single-phase AC grid able to provide electricity to each other.

The control circuit controls the first to eighteenth switch circuits, the bidirectional DC/DC convertor, the three-phase AC/DC transformer device, the single-phase AC/DC transformer device, and the renewable energy source to make the renewable energy source work as a primary power supply when the mobile micro-grid system provides electricity to the first external load, the second external load, the third external load, or the fourth external load.

According to an embodiment of the present invention, a control method for a mobile micro-grid system is provided. The mobile micro-grid system comprises a renewable energy source and a non-renewable energy source which are arranged in a container. The control method comprises using the renewable energy source as a primary power supply when the mobile micro-grid system provides electricity to an external load; and determining whether the renewable energy source provides sufficient electricity; wherein if the renewable energy source provides sufficient electricity, then electricity is provided by the renewable energy source; herein if the renewable energy source does not provide sufficient electricity, then electricity is provided by the renewable energy source and the non-renewable energy source.

Moreover, if the mobile micro-grid system is connected to an external power source which is a renewable-energy-type power source, then the external power source and the renewable energy source are both used as the primary power supply.

BRIEF DESCRIPTION OF THE DRAWINGS

The present invention can be more fully understood by reading the subsequent detailed description and examples with references made to the accompanying drawings, wherein:

FIGS. 4B-1 to 4B-4 show a flow chart of a control method for a mobile micro-grid system according to another exemplary embodiment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
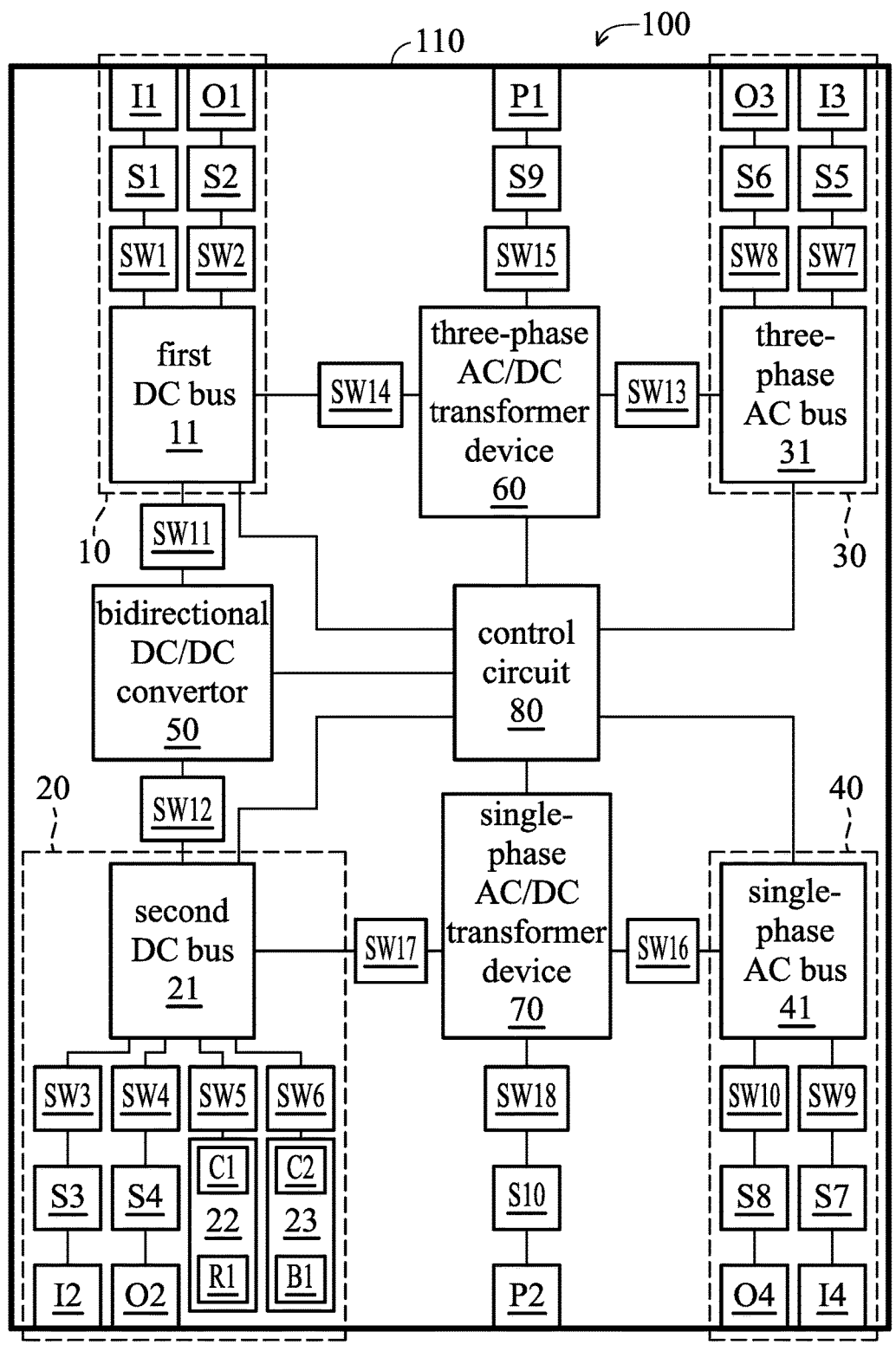
FIG. 1 shows a mobile micro-grid system according to an exemplary embodiment.

FIG. 1 shows a mobile micro-grid system 100 according to an exemplary embodiment of the present invention. The mobile micro-grid system 100 includes the container 110. The container 110 includes the first DC power system 10, the second DC power system 20, the three-phase AC power system 30, the single-phase AC power system 40, the bidirectional DC/DC convertor 50, the three-phase AC/DC transformer device 60, the single-phase AC/DC transformer device 70, switch circuits SW1-SW18, sense circuits S1-S10, ports P1-P2, and the control circuit 80.

As shown in FIG. 1, the first DC power system 10 includes the first DC bus 11, the input port I1, sense circuits S1-S2, switch circuits SW1-SW2, and the output port O1. The first DC bus 11 is utilized to deliver a first DC voltage. The input port I1 is selectively connected to a first external power source (which is not shown in FIG. 1) to receive electricity from the first external power source. The sense circuit S1 connected to the input port I1 detects whether the first external power source is connected to the input port I1. If the first external power source is connected to the input port I1, then the sense circuit S1 detects the voltage value of the first external power source. The switch circuit SW1 is connected to the first DC bus 11 and the sense circuit S1 and used to connect or disconnect the path between the first external power source and the first DC bus 11. The output port O1 is selectively connected to a first external load (which is not shown in FIG. 1) to provide the first DC voltage to the first external load. The sense circuit S2 connected to the output port O1 detects whether the first external load is connected to the output port O1. The switch circuit SW2 is connected to the first DC bus 11 and the sense circuit S2 and used to connect or disconnect the path between the first external load and the first DC bus 11.

The second DC power system 20 includes the second DC bus 21, the input port I2, sense circuits S3-S4, switch circuits SW3-SW6, the output port O2, the renewable energy source 22, and the energy storage device 23. The second DC bus 21 is utilized to deliver a second DC voltage. The input port I2 is selectively connected to a second external power source (which is not shown in FIG. 1) to receive electricity from the second external power source. The sense circuit S3 connected to the input port I2 detects whether the second external power source is connected to the input port I2. If the second external power source is connected to the input port I2, then the sense circuit S3 detects the voltage value of the second external power source. The switch circuit SW3 is connected to the second DC bus 21 and the sense circuit S3 and used to connect or disconnect the path between the second external power source and the second DC bus 21. The output port O2 is selectively connected to a second external load (which is not shown in FIG. 1) to provide the second DC voltage to the second external load. The sense circuit S4 connected to the output port O2 detects whether the second external load is connected to the output port O2. The switch circuit SW4 is connected to the second DC bus 21 and the sense circuit S4 and used to connect or disconnect the path between the second external load and the second DC bus 21. The renewable energy source 22 includes the renewable-energy-power-generating device R1 and the voltage-conversion device C1. The renewable energy source 22 makes the voltage-conversion device C1 convert electricity generated by the renewable-energy-power-generating device R1 into the second DC voltage, and then the second DC voltage is delivered to the second DC bus 21 through the path controlled by the switch circuit SW5. The energy storage device 23 includes the battery B1 and the bidirectional DC/DC convertor C2. The energy storage device 23 receives the second DC voltage of the second DC bus 21 through the switch circuit SW6. The energy storage device 23 makes the bidirectional DC/DC convertor C2 convert the second DC voltage into a first charging voltage delivered to the battery B1, or makes the bidirectional DC/DC convertor C2 convert the first discharging voltage of the battery B1 into the second DC voltage delivered to the second DC bus 21 through the path controlled by the switch circuit SW6.

In some embodiments, the renewable-energy-power-generating device R1 may be a power-generating device using the solar energy source, and the voltage-conversion device C1 may be a DC/DC convertor. In some embodiments, the renewable-energy-power-generating device R1 may be a power-generating device using a wind power source, and the voltage-conversion device C1 may be an AC/DC convertor.

The three-phase AC power system 30 includes the three-phase AC bus 31, the input port I3, sense circuits S5-S6, switch circuits SW7-SW8, and the output port O3. The three-phase AC bus 31 is utilized to deliver a three-phase AC voltage. The input port I3 is selectively connected to a third external power source (which is not shown in FIG. 1) to receive electricity from the third external power source. The sense circuit S5 connected to the input port I3 detects whether the third external power source is connected to the input port I3. If the third external power source is connected to the input port I3, then the sense circuit S5 detects the voltage value, phase, and frequency of the AC voltage of the third external power source. The switch circuit SW7 is connected to the three-phase AC bus 31 and the sense circuit S5 and used to connect or disconnect the path between the third external power source and the three-phase AC bus 31. The output port O3 is selectively connected to a third external load (which is not shown in FIG. 1) to provide the three-phase AC voltage to the third external load. The sense circuit S6 connected to the output port O3 detects whether the third external load is connected to the output port O3. The switch circuit SW8 is connected to the three-phase AC bus 31 and the sense circuit S6 and used to connect or disconnect the path between the third external load and the three-phase AC bus 31.

The single-phase AC power system 40 includes the single-phase AC bus 41, the input port I4, sense circuits S7-S8, switch circuits SW9-SW10, and the output port O4. The single-phase AC bus 41 is utilized to deliver a single-phase AC voltage. The input port I4 is selectively connected to a fourth external power source (which is not shown in FIG. 1) to receive electricity from the fourth external power source. The sense circuit S7 connected to the input port I4 detects whether the fourth external power source is connected to the input port I4. If the fourth external power source is connected to the input port I4, then the sense circuit S7 detects the voltage value and frequency of the AC voltage of the fourth external power source. The switch circuit SW9 is connected to the single-phase AC bus 41 and the sense circuit S7 and used to connect or disconnect the path between the fourth external power source and the single-phase AC bus 41. The output port O4 is selectively connected to a fourth external load (which is not shown in FIG. 1) to provide the single-phase AC voltage to the fourth external load. The sense circuit S8 connected to the output port O4 detects whether the fourth external load is connected to the output port O4. The switch circuit SW10 is connected to the single-phase AC bus 41 and the sense circuit S8 and used to connect or disconnect the path between the fourth external load and the single-phase AC bus 41.

The bidirectional DC/DC convertor 50 is coupled to the first DC bus 11 through the switch circuit SW11 and coupled to the second DC bus 21 through the switch circuit SW12. The bidirectional DC/DC convertor 50 performs DC voltage conversion to make it so that the first DC bus 11 and the second DC bus 21 can provide DC electricity to each other.

The three-phase AC/DC transformer device 60 is coupled to the three-phase AC bus 31 through the switch circuit SW13, coupled to the first DC bus 11 through the switch circuit SW14, and coupled to the sense circuit S9 through the switch circuit SW15. The sense circuit S9 is connected to the port P1. The port P1 is selectively connected to a three-phase AC grid (which is not shown in FIG. 1) to receive electricity from the three-phase AC grid or provide electricity to the three-phase AC grid. The sense circuit S9 is utilized to detect whether the three-phase AC grid is connected to the port P1. If the three-phase AC grid is connected to the port P1, then the sense circuit S9 detects the voltage value, phase, and frequency of the AC voltage of the three-phase AC grid. In this embodiment, the three-phase AC/DC transformer device 60 is able to perform AC/DC conversion and DC/AC conversion to make the three-phase AC bus 31 and the first DC bus 11 able to provide electricity to each other (e.g. in the condition that the switch circuits SW13-SW14 are turned on) and also make the three-phase AC grid and the first DC bus 11 able to provide electricity to each other (e.g. in the condition that the three-phase AC grid is connected to the port P1, and the switch circuits SW14-SW15 are turned on). Moreover, the three-phase AC/DC transformer device 60 also has a path for delivering AC electricity, which makes the three-phase AC bus 31 and the three-phase AC grid able to provide electricity to each other (e.g. in the condition that the three-phase AC grid is connected to the port P1, and the switch circuit SW13 and switch circuit SW15 are turned on).

The single-phase AC/DC transformer device 70 is coupled to the single-phase AC bus 41 through the switch circuit SW 16, coupled to the second DC bus 21 through the switch circuit SW17, and coupled to the sense circuit S10 through the switch circuit SW18. The sense circuit S10 is connected to port P2. The port P2 is selectively connected to a single-phase AC grid (which is not shown in FIG. 1) to receive electricity from the single-phase AC grid or provide electricity to the single-phase AC grid. The sense circuit S10 is utilized to detect whether the single-phase AC grid is connected to the port P2. If the single-phase AC grid is connected to the port P2, then the sense circuit S10 detects the voltage value and frequency of the AC voltage of the single-phase AC grid. In this embodiment, the single-phase AC/DC transformer device 70 is able to perform AC/DC conversion and DC/AC conversion to make the single-phase AC bus 41 and the second DC bus 21 able to provide electricity to each other (e.g. in the condition that the switch circuits SW16-SW17 are turned on) and also make the single-phase AC grid and the second DC bus 21 able to provide electricity to each other (e.g. in the condition that the single-phase AC grid is connected to the port P2, and the switch circuits SW17-SW18 are turned on). Moreover, the single-phase AC/DC transformer device 70 also has a path for delivering AC electricity, which makes the single-phase AC bus 41 and the single-phase AC grid able to provide electricity to each other (e.g. in the condition that the single-phase AC grid is connected to the port P2, and the switch circuit SW16 and switch circuit SW18 are turned on).

The control circuit 80 is connected to the switch circuits SW1-SW18, sense circuits S1-S10, the first DC bus 11, the second DC bus 21, the three-phase AC bus 31, the single-phase AC bus 41, the bidirectional DC/DC convertor 50, the three-phase AC/DC transformer device 60, the single-phase AC/DC transformer device 70, the renewable energy source 22, and the energy storage device 23. The control circuit 80 separately controls on/off operations of the switch circuits SW1-SW18, separately receives the detection results of the sense circuits S1-S10, detects the voltage values of the first DC bus 11 and the second DC bus 21, detects the voltage value, phase, and frequency of the AC voltage of the three-phase AC bus 31, and detects the voltage value and frequency of the AC voltage of the single-phase AC bus 41. The control circuit 80 also separately controls operations of the bidirectional DC/DC convertor 50, the three-phase AC/DC transformer device 60, and the single-phase AC/DC transformer device 70 (e.g. on/off operations and the control of the voltage conversion). Moreover, the control circuit 80 is coupled to the renewable energy source 22 to detect the electricity generated by the renewable-energy-power-generating device R1 and control the operation of the voltage-conversion device C1, and the control circuit 80 is also coupled to the energy storage device 23 to detect the status of the battery B1 (e.g. voltage, current, power, temperature, and the remaining electricity capacity, etc.) and control the operation of the bidirectional DC/DC convertor C2.

In some embodiments, each sense circuit of the sense circuits S1-S10 includes a voltage detection circuit or a current detection circuit, but the present invention is not limited to this description. In some embodiments, the control circuit 80 may be a processor or a special purpose processor, but the present invention is not limited to this description. In some embodiments, the voltage value of the first DC voltage is larger than the voltage value of the second DC voltage. In some embodiments, the voltage value of the first DC voltage is less than the voltage value of the second DC voltage. In some embodiments, the first DC voltage is 380 volts; the second DC voltage is 48 volts; the three-phase AC voltage is 380 volts/220 volts; and the single-phase AC voltage is 220 volts/110 volts, but the present invention is not limited to these descriptions.

In some embodiments, when the mobile micro-grid system 100 provides electricity to the first external load, the second external load, the third external load, or the fourth external load, the control circuit 80 controls switch circuits SW1-SW18, the bidirectional DC/DC convertor 50, the three-phase AC/DC transformer device 60, and the single-phase AC/DC transformer device 70 to make the renewable energy source 22 work as a primary power supply. For example, in one embodiment, the switch circuits SW1-SW18 are turned off in the beginning. When the sense circuit S6 detects that the third external load is connected to the output port O3, the sense circuit S6 sends the detection result to the control circuit 80. According to the detection result sent by the sense circuit S6, the control circuit 80 turns on switch circuits SW5, SW12, SW11, SW14, SW13, and SW8 and turns on the bidirectional DC/DC convertor 50 and three-phase AC/DC transformer device 60 to make the renewable energy source 22 work as the primary power supply which is the first power supply providing electricity to the third external load.

In one embodiment, switch circuits SW1-SW18 are turned off in the beginning. When the sense circuit S2 detects that the first external load is connected to the output port O1, the sense circuit S8 detects that the fourth external load is connected to the output port O4, and the sense circuit S9 detects that the three-phase AC grid is connected to the port P1, the sense circuits S2, S8, and S9 separately send the respective detection results to the control circuit 80. According to the detection results sent by the sense circuits S2, S8, and S9, the control circuit 80 turns on the switch circuits SW5, SW12, SW11, SW2, SW17, SW16, and SW10 and turns on the bidirectional DC/DC convertor 50 and single-phase AC/DC transformer device 70 to make the renewable energy source 22 work as a primary power supply which is the first power supply providing electricity to the first external load and the fourth external load. In this embodiment, if the control circuit 80 detects that the electricity of the second DC bus 21 is not sufficient (e.g. in the condition that the expected voltage value of the second DC bus 21 is 48 volts, but the voltage value of the second DC bus 21 detected by the control circuit 80 is 40 volt), then the control circuit 80 turns on the switch circuit SW6 to further make the energy storage device 23 provide electricity to the second DC bus 21. In this embodiment, if the control circuit 80 detects that the electricity of the second DC bus 21 received from the renewable energy source 22 and the energy storage device 23 is not sufficient, then the control circuit 80 turns on the switch circuits SW15 and SW14 and turns on the three-phase AC/DC transformer device 60 to further make the three-phase AC grid provide electricity to the first external load and the fourth external load.

Based on the operations described above, when at least one external load is connected to the mobile micro-grid system 100, the control circuit 80 controls switch circuits SW1-SW18, the bidirectional DC/DC convertor 50, the three-phase AC/DC transformer device 60, and the single-phase AC/DC transformer device 70 to make the renewable energy source 22 work as the primary power supply.

Figure 2:
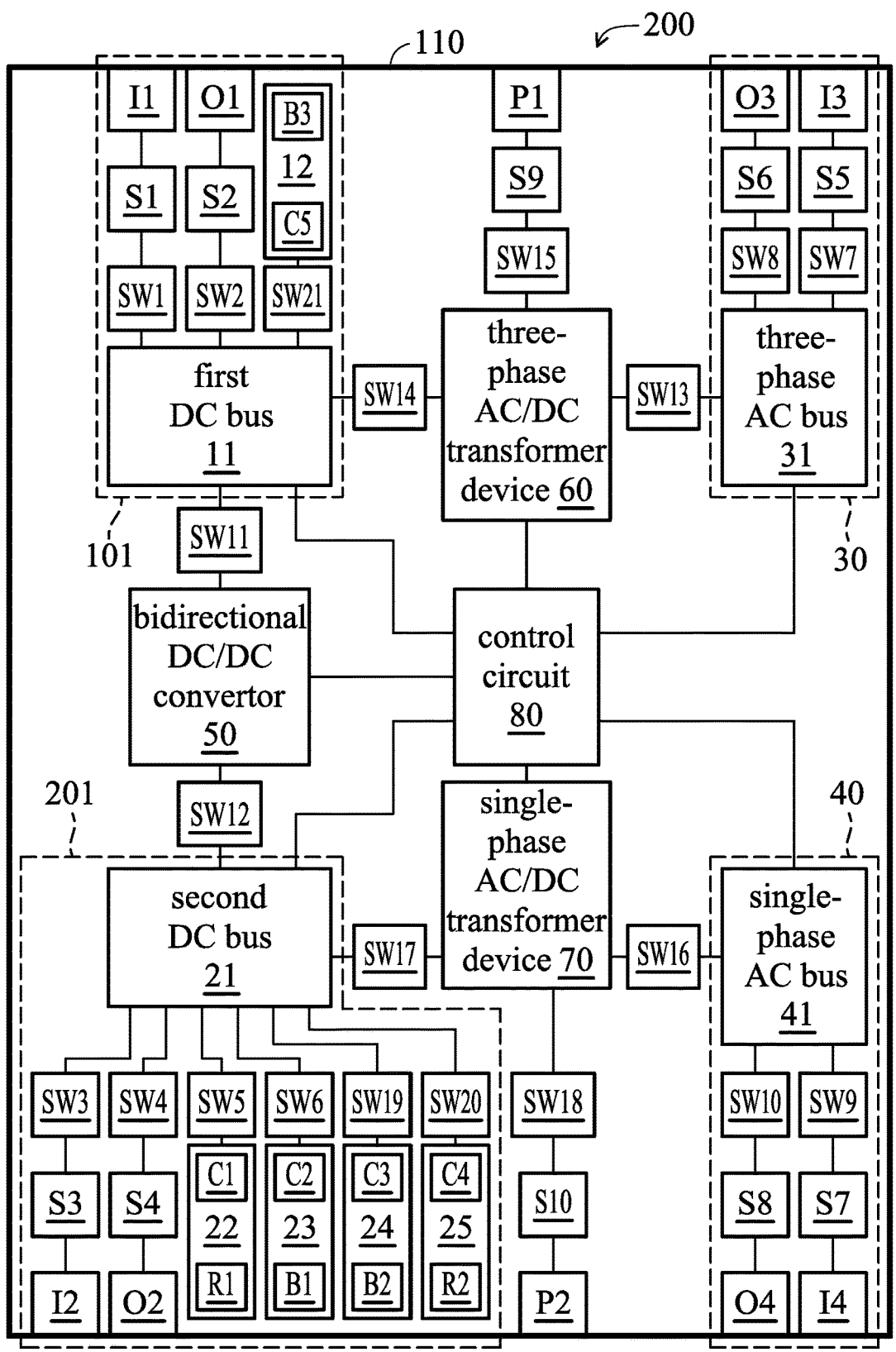
FIG. 2 shows a mobile micro-grid system according to another exemplary embodiment.

FIG. 2 shows a mobile micro-grid system 200 according to an embodiment of the present invention. The differences between the mobile micro-grid system 200 and the mobile micro-grid system 100 are the fuel-battery device 24, the second renewable energy source 25, and the switch circuits SW19-SW20 of the second DC power system 201 and the second energy storage device 12 and the switch circuit SW21 of the first DC power system 101. The rest of the elements of the mobile micro-grid system 200 are the same as the mobile micro-grid system 100, and the descriptions of these elements are omitted for conciseness.

The difference between the second DC power system 201 and the second DC power system 20 is that the second DC power system 201 further comprises the fuel-battery device 24, the second renewable energy source 25, and the switch circuits SW19-SW20. The fuel-battery device 24 includes the fuel battery B2 and the DC/DC convertor C3. The fuel-battery device 24 makes the DC/DC converter C3 convert electricity generated by the fuel battery B2 into the second DC voltage delivered to the second DC bus 21 through the path controlled by the switch circuit SW19. The second renewable energy source 25 includes the second renewable-energy-power-generating device R2 and the voltage-conversion device C4. The second renewable energy source 25 makes the voltage-conversion device C4 convert electricity generated by the second renewable-energy-power-generating device R2 into the second DC voltage delivered to the second DC bus 21 through the path controlled by the switch circuit SW20.

In some embodiments, the second renewable-energy-power-generating device R2 may be a power-generating device using the solar energy source, and the voltage-conversion device C4 may be a DC/DC convertor. In some embodiments, the second renewable-energy-power-generating device R2 may be a power-generating device using the wind power source, and the voltage-conversion device C4 may be an AC/DC convertor.

The difference between the first DC power system 101 and the first DC power system 10 is that the first DC power system 101 further includes the second energy storage device 12 and the switch circuit SW21. The second energy storage device 12 includes the battery B3 and the bidirectional DC/DC convertor C5. The second energy storage device 12 can separately receive electricity from the renewable energy source 22 and the second renewable energy source 25 through the switch circuit SW21, the first DC bus 11, the switch circuit SW11, the bidirectional DC/DC convertor 50, the switch circuit SW12, the second DC bus 21, the switch circuit SW5, and the switch circuit SW20. The second energy storage device 12 makes the bidirectional DC/DC convertor C5 convert the first DC voltage of the first DC bus 11 delivered through the switch circuit SW21 into a second charging voltage delivered to the battery B3, or makes the bidirectional DC/DC convertor C5 convert the second discharging voltage of the battery B3 into the first DC voltage delivered to the first DC bus 11 through the path controlled by the switch circuit SW21.

The control circuit 80 of the mobile micro-grid system 200 is coupled to the switch circuits SW1-SW21, the sense circuits S1-S10, the first DC bus 11, the second DC bus 21, the three-phase AC bus 31, the single-phase AC bus 41, the bidirectional DC/DC convertor 50, the three-phase AC/DC transformer device 60, the single-phase AC/DC transformer device 70, the renewable energy source 22, the energy storage device 23, the fuel-battery device 24, the second renewable energy source 25, and the second energy storage device 12. The control circuit 80 separately controls on/off operations of the switch circuits SW1-SW21, separately receives the detection results of the sense circuits S1-S10, detects the voltage values of the first DC bus 11 and the second DC bus 21, detects the voltage value, phase, and frequency of the AC voltage of the three-phase AC bus 31, and detects the voltage value and frequency of the AC voltage of the single-phase AC bus 41. The control circuit 80 also separately controls operations of the bidirectional DC/DC convertor 50, the three-phase AC/DC transformer device 60, and the single-phase AC/DC transformer device 70 (e.g. on/off operations and the control of the voltage conversion). Moreover, the control circuit 80 is coupled to the renewable energy source 22 to detect the electricity generated by the renewable-energy-power-generating device R1 and control the operation of the voltage-conversion device C1. The control circuit 80 is coupled to the energy storage device 23 to detect the status of the battery B1 (e.g. voltage, current, power, temperature, and the remaining electricity capacity, etc.) and control the operation of the bidirectional DC/DC convertor C2. The control circuit 80 is coupled to the fuel-battery device 24 to detect the electricity generated by the fuel battery B2 and control the operation of the DC/DC convertor C3. The control circuit 80 is coupled to the second renewable energy source 25 to detect the electricity generated by the second renewable-energy-power-generating device R2 and control the operation of the voltage-conversion device C4. The control circuit 80 is coupled to the second energy storage device 12 to detect the status of the battery B3 (e.g. voltage, current, power, temperature, and the remaining electricity capacity, etc.) and control the operation of the bidirectional DC/DC convertor C5.

In some embodiments, the energy storage device 23 and the second energy storage device 12 store electricity from the renewable energy source 22 and the second renewable energy source 25 while the mobile micro-grid system 200 is not outputting electricity to at least one external load.

In some embodiments, when at least one external load is connected to the mobile micro-grid system 200, the control circuit 80 controls the switch circuits SW1-SW21, the bidirectional DC/DC convertor 50, the three-phase AC/DC transformer device 60, and the single-phase AC/DC transformer device 70 to make the renewable energy source 22 and the second renewable energy source 25 work as a primary power supply. Specifically, when the mobile micro-grid system 200 provides electricity to at least one external load, the mobile micro-grid system 200 provides electricity in the following sequence. Firstly, the mobile micro-grid system 200 provides electricity from the renewable energy source 22 and the second renewable energy source 25. Secondly, if electricity provided by the mobile micro-grid system 200 is not sufficient, then the mobile micro-grid system 200 further provides electricity from the energy storage device 23 or the second energy storage device 12 (or both). Thirdly, if electricity provided by the mobile micro-grid system 200 is still not sufficient, then the mobile micro-grid system 200 further provides electricity from the fuel-battery device 24. If a three-phase AC grid or a single-phase AC grid is connected to the mobile micro-gird system 200 and the electricity of the mobile micro-grid system 200 provided by the renewable energy source 22, the second renewable energy source 25, the energy storage device 23, the second energy storage device 12, the fuel-battery device 24, and at least one external power source connected to the mobile micro-grid system 200 is still not sufficient, then the mobile micro-grid system 200 further controls the switch circuits SW1-SW21, the bidirectional DC/DC convertor 50, the three-phase AC/DC transformer device 60, and the single-phase AC/DC transformer device 70 to further make the three-phase AC grid or the single-phase AC grid provide electricity to at least one external load connected to the mobile micro-grid system 200.

In one embodiment, the switch circuits SW1-SW21 of the mobile micro-grid system 200 are turned off in the beginning. When the sense circuit S4 detects that the second external load is connected to the output port O2, the sense circuit S2 detects that the first external load is connected to the output port O1, and the sense circuit S9 detects that the three-phase AC grid is connected to the port P1, the sense circuits S2, S4, and S9 separately send the respective detection results to the control circuit 80. According to the detection results sent by the sense circuits S2, S4, and S9, the control circuit 80 turns on the switch circuits SW5, SW20, SW4, SW12, SW11, and SW2 and turns on the bidirectional DC/DC convertor 50 to make the renewable energy source 22 and the second renewable energy source 25 work as a primary power supply which is the first power supply providing electricity to the first external load and the second external load.

In this embodiment, if the control circuit 80 detects that the electricity of the second DC bus 21 is not sufficient, then the control circuit 80 turns on the switch circuit SW6 to further make the energy storage device 23 provide electricity to the second DC bus 21. In this embodiment, if the control circuit 80 detects that the electricity of the second DC bus 21 received from the renewable energy source 22, the second renewable energy source 25, and the energy storage device 23 is not sufficient, then the control circuit 80 turns on the switch circuit SW19 to further make the fuel-battery device 24 provide electricity to the second DC bus 21. If the control circuit 80 detects that the electricity of the second DC bus 21 received from the renewable energy source 22, the second renewable energy source 25, the energy storage device 23, and the fuel-battery device 24 is not sufficient, then the control circuit 80 turns on the switch circuits SW15 and SW14 and turns on the three-phase AC/DC transformer device 60 to further make the three-phase AC grid provide electricity to the first external load and the second external load.

In this embodiment, if the control circuit 80 detects that the electricity of the first DC bus 11 is not sufficient, then the control circuit 80 turns on the switch circuit SW21 to further make the second energy storage device 12 provide electricity to the first DC bus 11.

In another embodiment, the switch circuits SW1-SW21 of the mobile micro-grid system 200 are turned off in the beginning. When the sense circuit S4 detects that the second external load is connected to the output port O2, the sense circuit S8 detects that the fourth external load is connected to the output port O4, and the sense circuit S10 detects that the single-phase AC grid is connected to the port P2, the sense circuits S4, S8, and S10 separately send the respective detection results to the control circuit 80. According to the detection results sent by the sense circuits S4, S8, and S10, the control circuit 80 turns on the switch circuits SW5, SW20, SW4, SW17, SW16, and SW10 and turns on the single-phase AC/DC transformer device 70 to make the renewable energy source 22 and the second renewable energy source 25 work as the primary power supply which is the first power supply providing electricity to the second external load and the fourth external load.

In this embodiment, if the control circuit 80 detects that electricity of the second DC bus 21 is not sufficient, then the control circuit 80 turns on the switch circuit SW6 to further make the energy storage device 23 provide electricity to the second DC bus 21. In this embodiment, if the control circuit 80 detects that the electricity of the second DC bus 21 received from the renewable energy source 22, the second renewable energy source 25, and the energy storage device 23 is not sufficient, then the control circuit 80 turns on the switch circuits SW21, SW11, and SW12 and turns on the bidirectional DC/DC convertor 50 to further make the second energy storage device 12 provide electricity to the second DC bus 21. In this embodiment, if the control circuit 80 detects that the electricity of the second DC bus 21 received from the renewable energy source 22, the second renewable energy source 25, the energy storage device 23, and the second energy storage device 12 is not sufficient, then the control circuit 80 turns on the switch circuit SW19 to further make the fuel-battery device 24 provide electricity to the second DC bus 21. If the control circuit 80 detects that the electricity of the second DC bus 21 received from the renewable energy source 22, the second renewable energy source 25, the energy storage device 23, the second energy storage device 12, and the fuel-battery device 24 is not sufficient, then the control circuit 80 turns on the switch circuit SW18 to further make the single-phase AC grid provide electricity to the second external load and the fourth external load.

In some embodiments, the mobile micro-grid system 200 provides electricity to at least one external load. If the control circuit 80 detects (e.g. through the sense circuit S1, the sense circuit S3, the sense circuit S5, and the sense circuit S7) that at least one external power source which is a renewable-energy-type power source (e.g. solar energy source or wind power source) is connected to the mobile micro-grid system 200, then the control circuit 80 controls the switch circuits SW1-SW21, the bidirectional DC/DC convertor 50, the three-phase AC/DC transformer device 60, and the single-phase AC/DC transformer device 70 to make the renewable energy source 22, the second renewable energy source 25, and at least one external power source (which is a renewable-energy-type power source and connected to the mobile micro-grid system 200) work as the primary power supply which provides electricity to at least one external load mentioned currently.

In one embodiment, the switch circuits SW1-SW21 of the mobile micro-grid system 200 are turned off in the beginning. When the sense circuit S6 detects that the third external load is connected to the output port O3, the sense circuit S7 detects that the fourth external power source which is a renewable-energy-type power source is connected to the input port I4, and the sense circuit S9 detects that the three-phase AC grid is connected to the port P1, the sense circuits S6, S7, and S9 separately send the respective detection results to the control circuit 80. According to the detection results sent by the sense circuits S6, S7, and S9, the control circuit 80 turns on switch circuits SW5, SW20, SW9, SW16, SW17, SW12, SW11, SW14, SW13, and SW8 and turns on the bidirectional DC/DC convertor 50, the three-phase AC/DC transformer device 60, and the single-phase AC/DC transformer device 70 to make the renewable energy source 22, the second renewable energy source 25, and the fourth external power source work as the primary power supply which is the first power supply providing electricity to the third external load.

In this embodiment, if the control circuit 80 detects that the electricity of the second DC bus 21 is not sufficient, then the control circuit 80 turns on the switch circuit SW6 to further make the energy storage device 23 provide electricity to the second DC bus 21. In this embodiment, if the control circuit 80 detects that the electricity of the second DC bus 21 received from the renewable energy source 22, the second renewable energy source 25, the fourth external power source, and the energy storage device 23 is not sufficient, then the control circuit 80 turns on the switch circuit SW19 to further make the fuel-battery device 24 provide electricity to the second DC bus 21. If the control circuit 80 detects that the electricity of the second DC bus 21 received from the renewable energy source 22, the second renewable energy source 25, the fourth external power source, the energy storage device 23, and the fuel-battery device 24 is not sufficient, then the control circuit 80 turns on the switch circuit SW15 to further make the three-phase AC grid provide electricity to the third external load.

In this embodiment, if the control circuit 80 detects that the electricity of the first DC bus 11 is not sufficient, then the control circuit 80 turns on the switch circuit SW21 to further make the second energy storage device 12 provide electricity to the first DC bus 11.

In some embodiments, the mobile micro-grid system 200 provides electricity to at least one external load. If the control circuit 80 detects (e.g. through the sense circuit S1, the sense circuit S3, the sense circuit S5, and the sense circuit S7) that at least one external power source which is not a renewable-energy-type power source is connected to the mobile micro-grid system 200, then the control circuit 80 controls the switch circuits SW1-SW21, the bidirectional DC/DC convertor 50, the three-phase AC/DC transformer device 60, and the single-phase AC/DC transformer device 70 to make at least one external power source (which is not a renewable-energy-type power source and is connected to the mobile micro-grid system 200) provide electricity to at least one external load mentioned currently only when the switch circuit SW19 is turned on.

In one embodiment, the switch circuits SW1-SW21 of the mobile micro-grid system 200 are turned off in the beginning. When the sense circuit S8 detects that the fourth external load is connected to the output port O4, the sense circuit S5 detects that the third external power source which is not a renewable-energy-type power source is connected to the input port I3, and the sense circuit S9 detects that the three-phase AC grid is connected to the port P1, the sense circuits S5, S8, and S9 separately send the respective detection results to the control circuit 80. According to the detection results sent by the sense circuits S5, S8, and S9, the control circuit 80 turns on the switch circuits SW5, SW20, SW17, SW16, and SW10 and turns on the single-phase AC/DC transformer device 70 to make the renewable energy source 22 and the second renewable energy source 25 work as the primary power supply which is the first power supply providing electricity to the fourth external load.

In this embodiment, if the control circuit 80 detects that the electricity of the second DC bus 21 is not sufficient, then the control circuit 80 turns on the switch circuit SW6 to further make the energy storage device 23 provide electricity to the second DC bus 21. In this embodiment, if the control circuit 80 detects that the electricity of the second DC bus 21 received from the renewable energy source 22, the second renewable energy source 25, and the energy storage device 23 is not sufficient, then the control circuit 80 turns on the switch circuits SW21, SW11, and SW12 and turns on the bidirectional DC/DC convertor 50 to further make the second energy storage device 12 provide electricity to the second DC bus 21. In this embodiment, if the control circuit 80 detects that the electricity of the second DC bus 21 received from the renewable energy source 22, the second renewable energy source 25, the energy storage device 23, and the second energy storage device 12 is not sufficient, then the control circuit 80 turns on the switch circuits SW19, SW7, SW13, and SW14 and turns on the three-phase AC/DC transformer device 60 to further make the fuel-battery device 24 and the third external power source provide electricity to the second DC bus 21. If the control circuit 80 detects that the electricity of the second DC bus 21 received from the renewable energy source 22, the second renewable energy source 25, the energy storage device 23, the second energy storage device 12, the fuel-battery device 24, and the third external power source is not sufficient, then the control circuit 80 turns on the switch circuit SW15 to further make the three-phase AC grid provide electricity to the fourth external load.

In some embodiments, at least one of the input ports I1-I4 of the mobile micro-grid system 200 may be designed as the dedicated input port for the renewable energy source, which is used to determine whether the external power source connected to the mobile micro-grid system 200 is a renewable-energy-type power source, but the present invention is not limited to this description. In some embodiments, when an external power source is connected to the mobile micro-grid system 200, the external power source transmits a wireless signal to the control circuit 80. The control circuit 80 receives the wireless signal and determines whether the external power source is a renewable-energy-type power source based on the wireless signal. In some embodiments, each input ports I1-I4 of the mobile micro-grid system 200 includes a specific wired-communication interface. The control circuit 80 is connected to each specific wired-communication interface through the communication line (which is not shown in FIG. 2). When the input port I1, I2, I3, or I4 is connected to an external power source, the external power source sends a wired-communication signal to the control circuit 80 if the external power source has a connector corresponding to the specific wired-communication interface. The control circuit 80 receives the wired-communication signal and determines whether the external power source is a renewable-energy-type power source based on the wired-communication signal.

In some embodiments, each sense circuit of the sense circuits S1-S10 of the mobile micro-grid system 200 includes a voltage detection circuit or a current detection circuit, but the present invention is not limited to this description. In some embodiments, the control circuit 80 of the mobile micro-grid system 200 may be a processor or a special purpose processor, but the present invention is not limited to this description. In some embodiments, the energy storage device 23 or the second energy storage device 12 is not limited to an energy storage device using the specific material, and the energy storage device 23 or the second energy storage device 12 may be a lead-acid battery, a lithium-iron battery, or a graphene battery, etc. In some embodiments, the voltage value of the first DC voltage of the mobile micro-grid system 200 is larger than the voltage value of the second DC voltage of the mobile micro-grid system 200. In some embodiments, the voltage value of the first DC voltage of the mobile micro-grid system 200 is less than the voltage value of the second DC voltage of the mobile micro-grid system 200. In some embodiments, the first DC voltage of the mobile micro-grid system 200 is 380 volts; the second DC voltage of the mobile micro-grid system 200 is 48 volts; the three-phase AC voltage of the mobile micro-grid system 200 is 380 volts/220 volts; and the single-phase AC voltage of the mobile micro-grid system 200 is 220 volts/110 volts, but the present invention is not limited to these descriptions.

Figure 3:
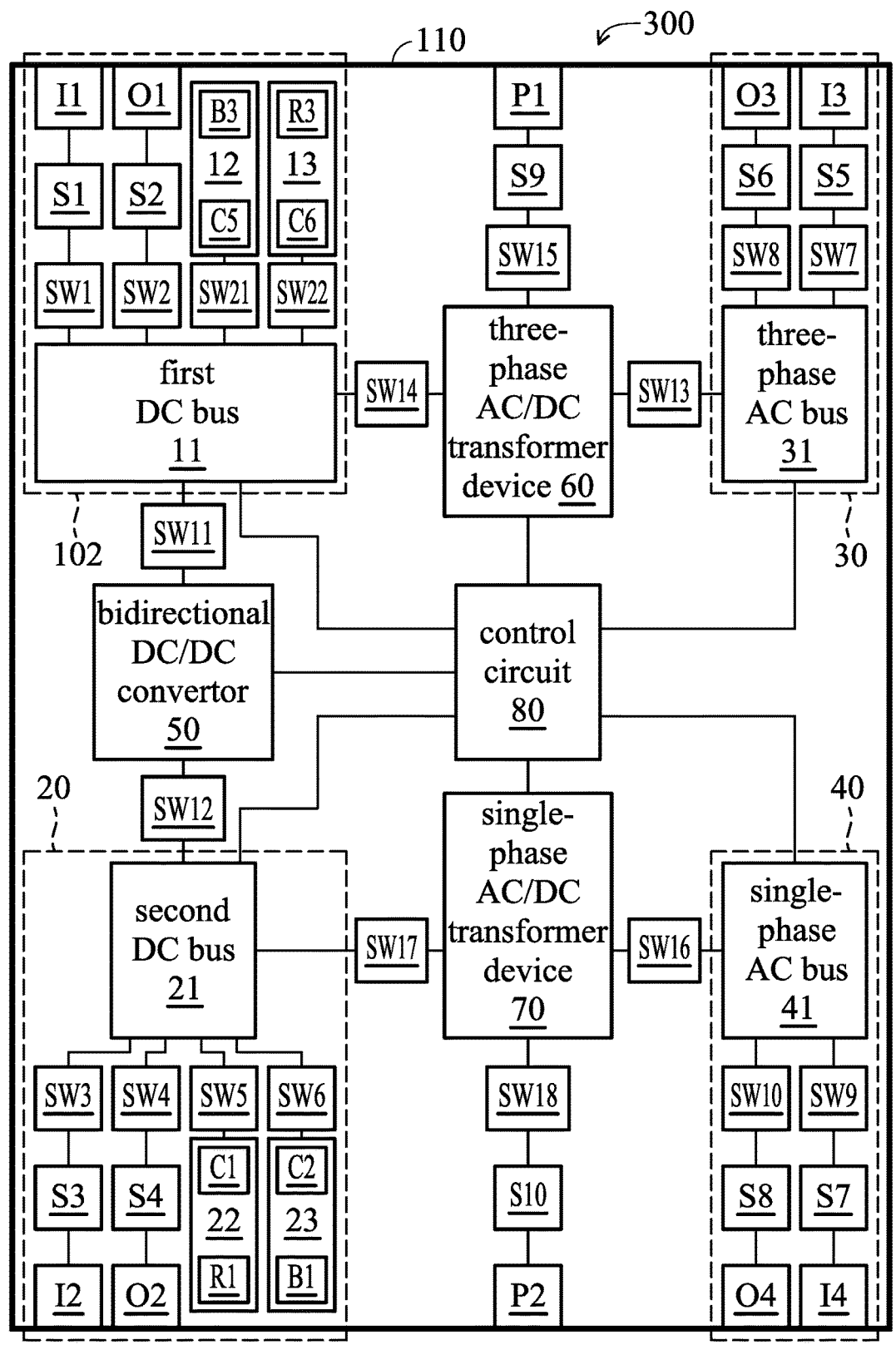
FIG. 3 shows a mobile micro-grid system according to another exemplary embodiment.

FIG. 3 shows a mobile micro-grid system 300 according to an embodiment of the present invention. In some embodiments, the first DC power system 101 of the mobile micro-grid system 200 can be replaced by the first DC power system 102. The difference between the mobile micro-grid system 100 and the mobile micro-grid system 300 is the first DC power system 102. The rest of the elements of the mobile micro-grid system 300 are the same as the mobile micro-grid system 100, and the descriptions of these elements are omitted for conciseness.

As shown in FIG. 1 and FIG. 3, the differences between the first DC power system 102 and the first DC power system 10 are the third renewable energy source 13, the second energy storage device 12, and the switch circuits SW21-SW22 of the first DC power system 102. The third renewable energy source 13 includes the third renewable-energy-power-generating device R3 (e.g. a power-generating device using the solar energy source or the wind power source) and the voltage-conversion device C6. The third renewable energy source 13 makes the voltage-conversion device C6 convert electricity generated by the third renewable-energy-power-generating device R3 into the first DC voltage delivered to the first DC bus 11 through the path controlled by the switch circuit SW22. The second energy storage device 12 includes the battery B3 and the bidirectional DC/DC convertor C5. The second energy storage device 12 receives electricity from the renewable energy source 22 and the third renewable energy source 13 through the switch circuit SW21, the bidirectional DC/DC convertor C5, and the first DC bus 11. The second energy storage device 12 makes the bidirectional DC/DC convertor C5 convert the first DC voltage of the first DC bus 11 delivered through the switch circuit SW21 into a second charging voltage delivered to the battery B3, or makes the bidirectional DC/DC convertor C5 convert the second discharging voltage of the battery B3 into the first DC voltage delivered to the first DC bus 11 through the path controlled by the switch circuit SW21. The switch circuits SW21-SW22 are coupled to the control circuit 80, and the on/off operations of the switch circuits SW21-SW22 are separately controlled by the control circuit 80.

In some embodiments, the third renewable-energy-power-generating device R3 may be a power-generating device using the solar energy source, and the voltage-conversion device C6 may be a DC/DC convertor. In some embodiments, the third renewable-energy-power-generating device R3 may be a power-generating device using the wind power source, and the voltage-conversion device C6 may be an AC/DC convertor.

In one embodiment, when the mobile micro-grid system 300 provides electricity to at least one external load, the control circuit 80 controls the switch circuits SW1-SW18, the switch circuits SW21-SW22, the bidirectional DC/DC convertor 50, the three-phase AC/DC transformer device 60, and the single-phase AC/DC transformer device 70 to make the renewable energy source 22 and the third renewable energy source 13 work as a primary power supply. In some embodiments, the energy storage device 23 and the second energy storage device 12 store electricity from the renewable energy source 22 and the third renewable energy source 13 while the mobile micro-grid system 300 is not outputting electricity to at least one external load.

In some embodiments, the mobile micro-grid system 300 provides electricity to at least one external load. If the control circuit 80 detects (e.g. through the sense circuit S1, the sense circuit S3, the sense circuit S5, and the sense circuit S7) that at least one external power source which is a renewable-energy-type power source (e.g. solar energy source or wind power source) is connected to the mobile micro-grid system 300, then the control circuit 80 controls the switch circuits SW1-SW18, the switch circuits SW21-SW22, the bidirectional DC/DC convertor 50, the three-phase AC/DC transformer device 60, and the single-phase AC/DC transformer device 70 to make the renewable energy source 22, the third renewable energy source 13, and at least one external power source (which is a renewable-energy-type power source and connected to the mobile micro-grid system 300) work as the primary power supply which provides electricity to at least one external load mentioned currently.

In some embodiments, the mobile micro-grid system 300 provides electricity to at least one external load. If the control circuit 80 detects that the electricity of the first DC bus 11 received from the third renewable energy source 13 is not sufficient, then the control circuit 80 turns on the switch circuit SW21 to further make the second energy storage device 12 provide electricity to the first DC bus 11. In some embodiments, if the mobile micro-grid system 300 is connected to a three-phase AC grid or a single-phase AC grid, and the electricity of the mobile micro-grid system 300 generated by the renewable energy source 22, the third renewable energy source 13, the energy storage device 23, the second energy storage device 12, and at least one external power source connected to the mobile micro-grid system 300 is not sufficient, then the mobile micro-grid system 300 further controls the switch circuits SW1-SW18, the switch circuits SW21-SW22, the bidirectional DC/DC convertor 50, the three-phase AC/DC transformer device 60, and the single-phase AC/DC transformer device 70 to make the three-phase AC grid or the single-phase AC grid provide electricity to at least one external load mentioned currently.

In some embodiments, each sense circuit of the sense circuits S1-S10 of the mobile micro-grid system 300 includes a voltage detection circuit or a current detection circuit, but the present invention is not limited to this description. In some embodiments, the control circuit 80 of the mobile micro-grid system 300 may be a processor or a special purpose processor, but the present invention is not limited to this description. In some embodiments, the energy storage device 23 or the second energy storage device 12 is not limited to an energy storage device using the specific material, and the energy storage device 23 or the second energy storage device 12 may be a lead-acid battery, a lithium-iron battery, or a graphene battery, etc. In some embodiments, the voltage value of the first DC voltage of the mobile micro-grid system 300 is larger than the voltage value of the second DC voltage of the mobile micro-grid system 300. In some embodiments, the voltage value of the first DC voltage of the mobile micro-grid system 300 is less than the voltage value of the second DC voltage of the mobile micro-grid system 300. In some embodiments, the first DC voltage of the mobile micro-grid system 300 is 380 volts; the second DC voltage of the mobile micro-grid system 300 is 48 volts; the three-phase AC voltage of the mobile micro-grid system 300 is 380 volts/220 volts; and the single-phase AC voltage of the mobile micro-grid system 300 is 220 volts/110 volts, but the present invention is not limited to these descriptions. In some embodiments, the limitations on the locations in which the mobile micro-grid system 100, 200, or 300 works can be overcome by the transportability of the container 110.

Figure 4A:
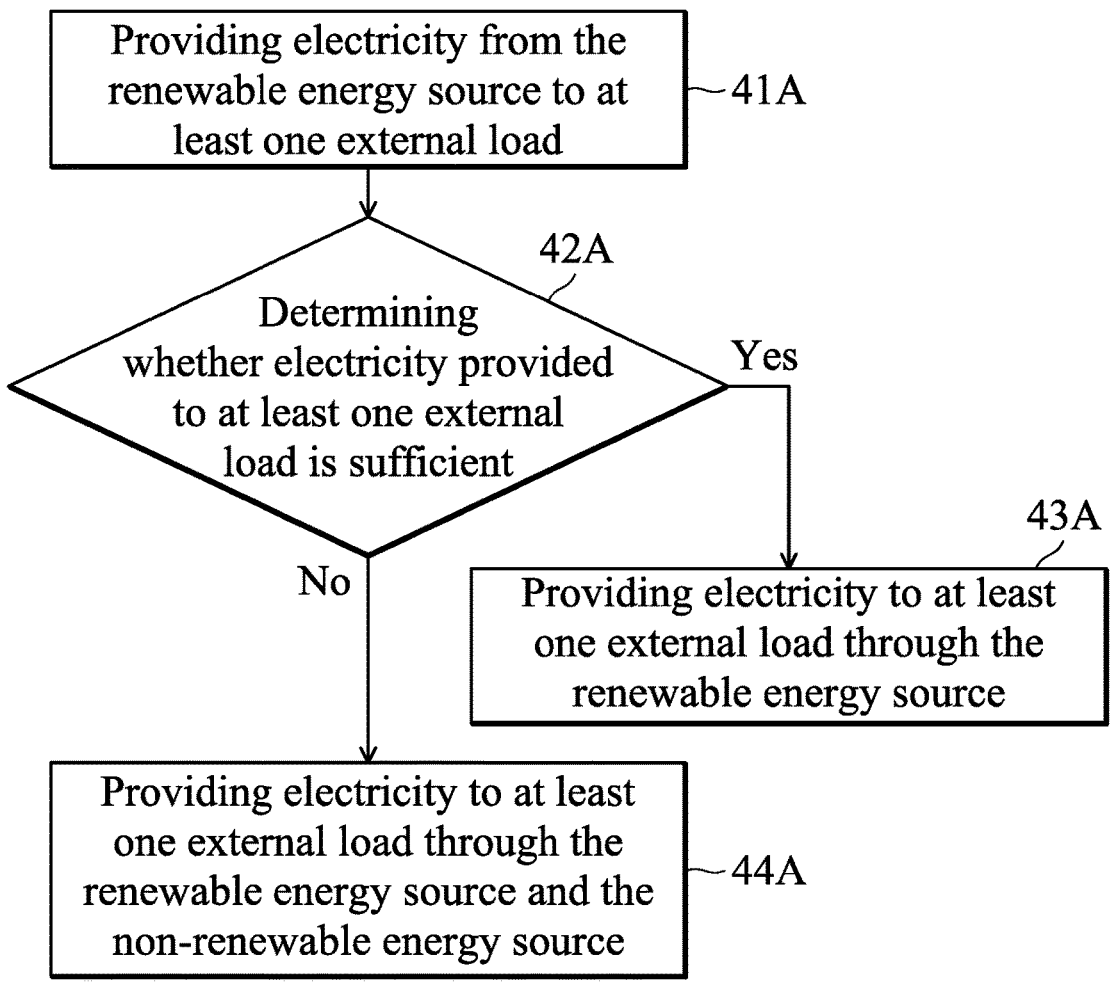
FIG. 4A shows a flow chart of a control method for a mobile micro-grid system according to an exemplary embodiment.

FIG. 4A shows a flow chart of a control method for a mobile micro-grid system according to an exemplary embodiment. The mobile micro-grid system includes a renewable energy source and a non-renewable energy source which are arranged in a container. The flow chart starts at step 41A. In step 41A, the control method provides electricity from the renewable energy source to at least one external load which is connected to the mobile micro-grid system. In step 42A, the control method determines whether electricity provided to at least one external load connected to the mobile micro-grid system is sufficient. If the electricity is sufficient, then the flow goes to step 43A; if the electricity is not sufficient, then the flow goes to step 44A. In step 43A, the control method provides electricity to at least one external load connected to the mobile micro-grid system through the renewable energy source. In step 44A, the control method provides electricity to at least one external load connected to the mobile micro-grid system through the renewable energy source and the non-renewable energy source.

Figures 1, 4B:
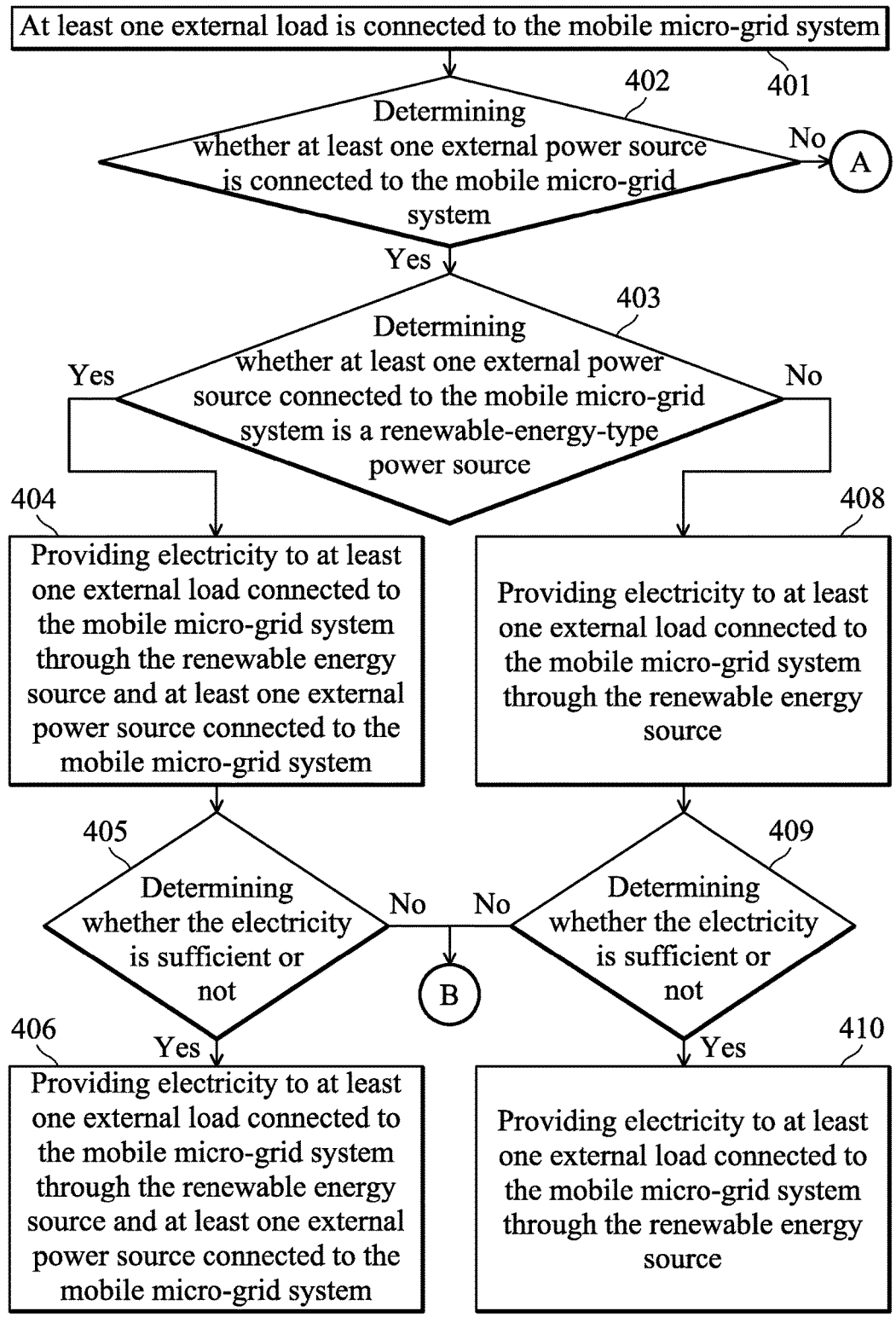
Figures 2, 4B:
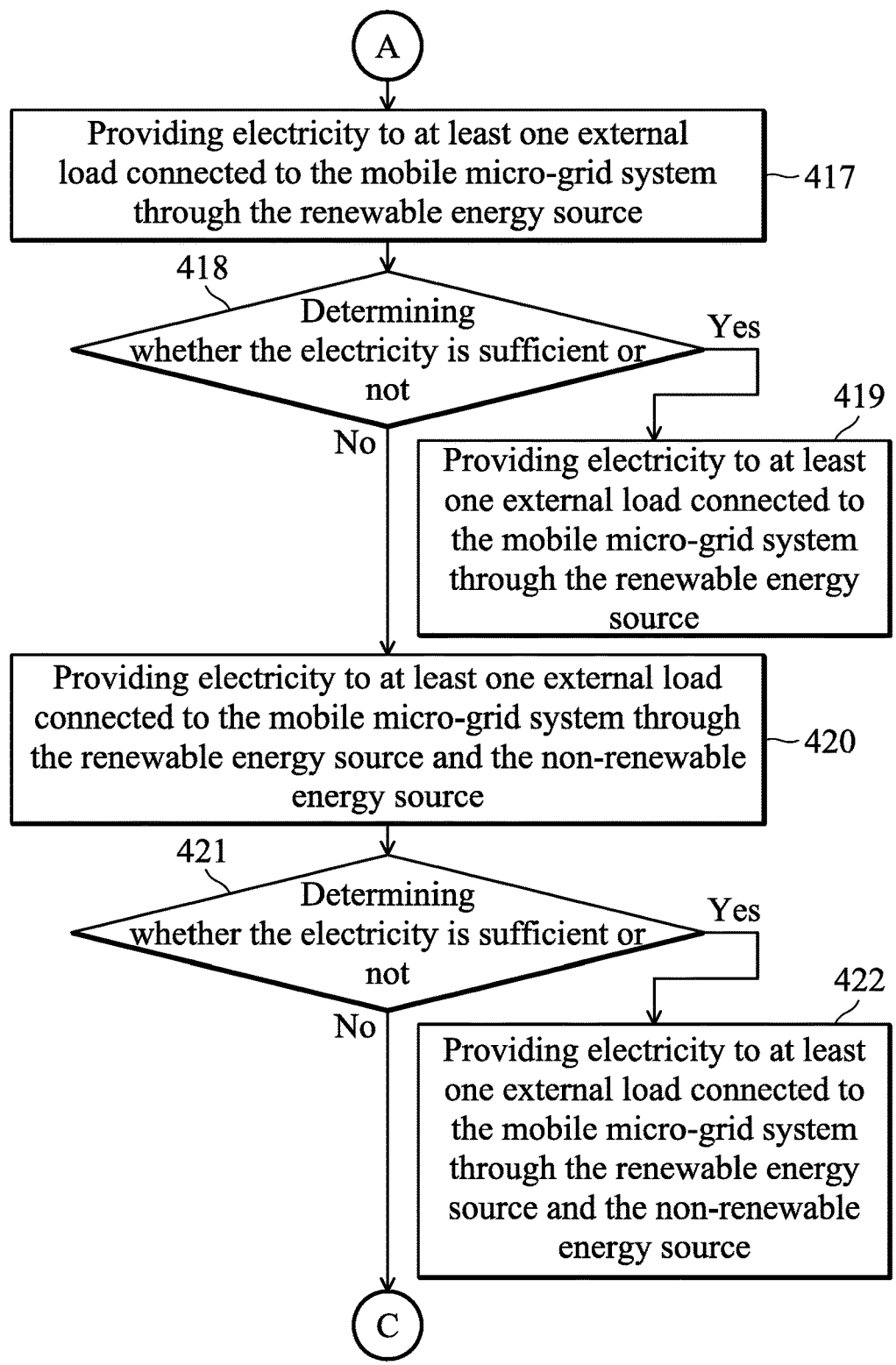
Figures 3, 4B:
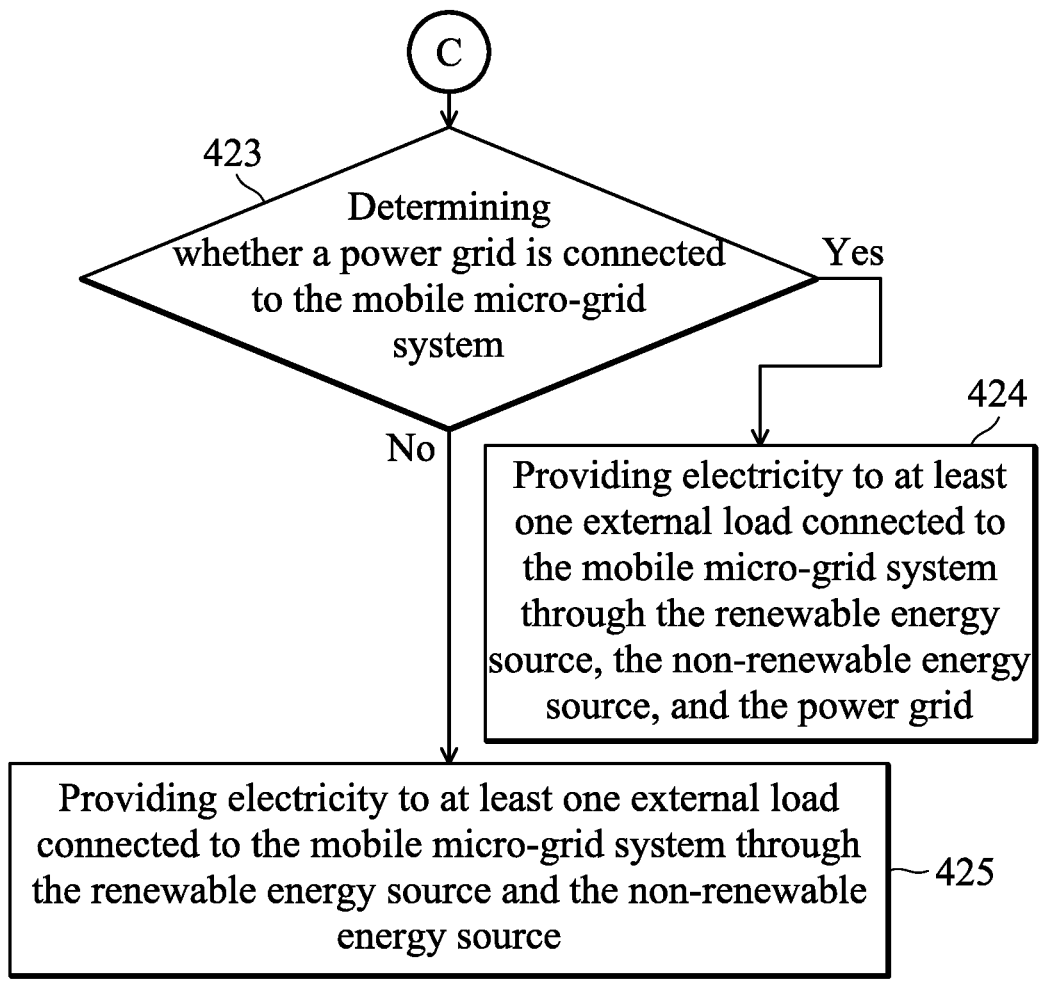
Figures 4, 4B:
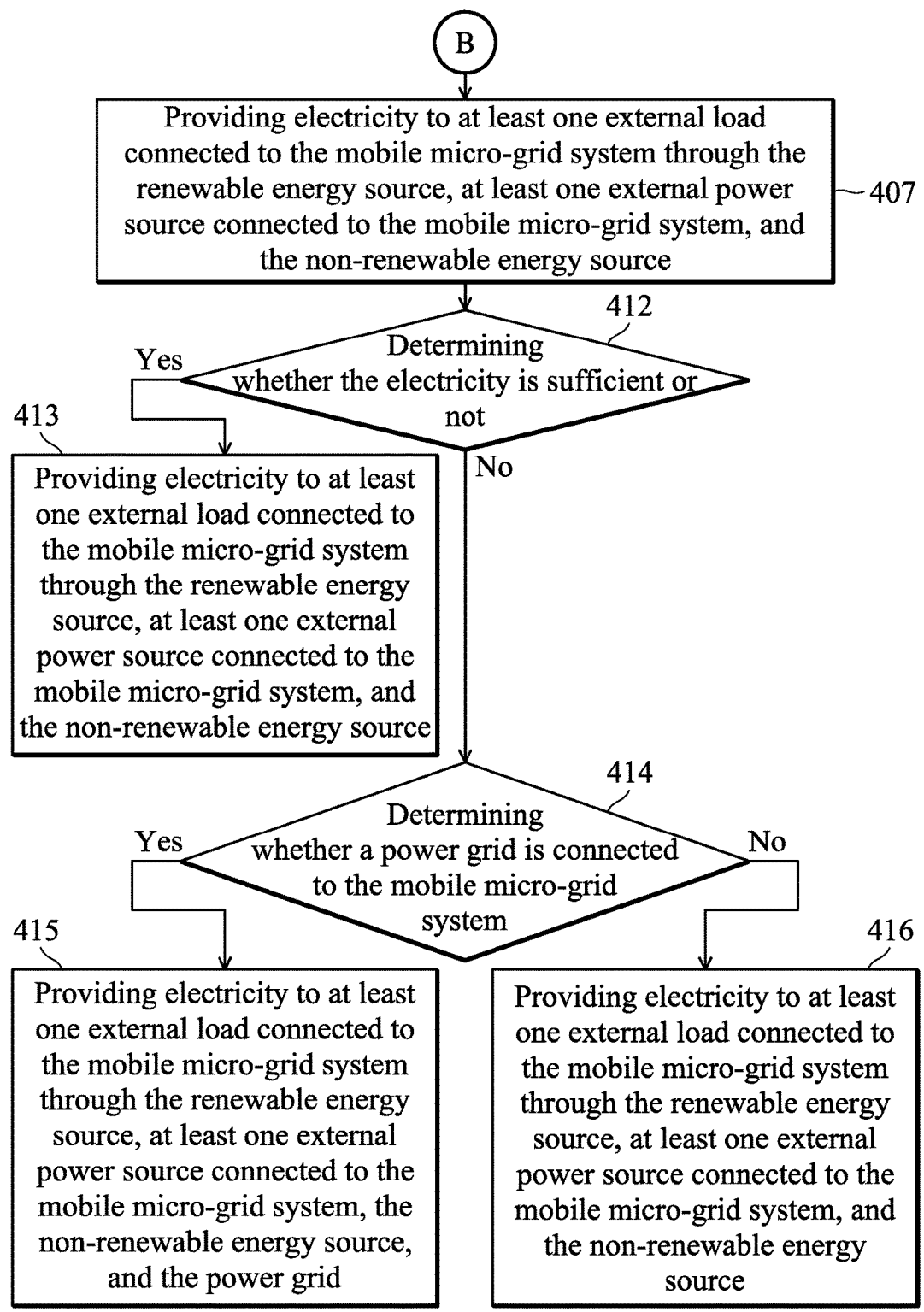

FIGS. 4B-1 to 4B-4 show a flow chart of a control method for a mobile micro-grid system according to another exemplary embodiment. The mobile micro-grid system includes a renewable energy source and a non-renewable energy source which are arranged in a container. The flow chart stats at step 401. In step 401, at least one external load is connected to the mobile micro-grid system. In step 402, the control method determines whether at least one external power source is connected to the mobile micro-grid system. If at least one external power source is connected to the mobile micro-grid system, then the flow goes to step 403; if at least one external power source is not connected to the mobile micro-grid system, then the flow goes to step 417. In step 403, the control method determines whether at least one external power source connected to the mobile micro-grid system is a renewable-energy-type power source. If at least one external power source connected to the mobile micro-grid system is a renewable-energy-type power source, then the flow goes to step 404; if at least one external power source connected to the mobile micro-grid system is not a renewable-energy-type power source, then the flow goes to step 408. In step 404, the control method provides electricity to at least one external load connected to the mobile micro-grid system through the renewable energy source and at least one external power source connected to the mobile micro-grid system. In step 405, the control method determines whether the electricity is sufficient or not. If the electricity is sufficient, the flow goes to step 406; if electricity is not sufficient, the flow goes to step 407. In step 406, the control method provides electricity to at least one external load connected to the mobile micro-grid system through the renewable energy source and at least one external power source connected to the mobile micro-grid system. In step 407, the control method provides electricity to at least one external load connected to the mobile micro-grid system through the renewable energy source, at least one external power source connected to the mobile micro-grid system, and the non-renewable energy source. In step 408, the control method provides electricity to at least one external load connected to the mobile micro-grid system through the renewable energy source. In step 409, the control method determines whether the electricity is sufficient or not. If the electricity is sufficient, the flow goes to step 410; if electricity is not sufficient, the flow goes to step 407. In step 410, the control method provides electricity to at least one external load connected to the mobile micro-grid system through the renewable energy source. In step 412, the control method determines whether the electricity is sufficient or not. If the electricity is sufficient, the flow goes to step 413; if electricity is not sufficient, the flow goes to step 414. In step 413, the control method provides electricity to at least one external load connected to the mobile micro-grid system through the renewable energy source, at least one external power source connected to the mobile micro-grid system, and the non-renewable energy source. In step 414, the control method determines whether a power grid is connected to the mobile micro-grid system. If the power grid is connected to the mobile micro-grid system, then the flow goes to step 415; if the power grid is not connected to the mobile micro-grid system, then the flow goes to step 416. In step 415, the control method provides electricity to at least one external load connected to the mobile micro-grid system through the renewable energy source, at least one external power source connected to the mobile micro-grid system, the non-renewable energy source, and the power grid. In step 416, the control method provides electricity to at least one external load connected to the mobile micro-grid system through the renewable energy source, at least one external power source connected to the mobile micro-grid system, and the non-renewable energy source.

In step 417, the control method provides electricity to at least one external load connected to the mobile micro-grid system through the renewable energy source. In step 418, the control method determines whether the electricity is sufficient or not. If the electricity is sufficient, the flow goes to step 419; if the electricity is not sufficient, the flow goes to step 420. In step 419, the control method provides electricity to at least one external load connected to the mobile micro-grid system through the renewable energy source. In step 420, the control method provides electricity to at least one external load connected to the mobile micro-grid system through the renewable energy source and the non-renewable energy source. In step 421, the control method determines whether the electricity is sufficient or not. If the electricity is sufficient, the flow goes to step 422; if the electricity is not sufficient, the flow goes to step 423. In step 422, the control method provides electricity to at least one external load connected to the mobile micro-grid system through the renewable energy source and the non-renewable energy source. In step 423, the control method determines whether a power grid is connected to the mobile micro-grid system. If a power grid is connected to the mobile micro-grid system, then the flow goes to step 424; if a power grid is not connected to the mobile micro-grid system, then the flow goes to step 425. In step 424, the control method provides electricity to at least one external load connected to the mobile micro-grid system through the renewable energy source, the non-renewable energy source, and the power grid. In step 425, the control method provides electricity to at least one external load connected to the mobile micro-grid system through the renewable energy source and the non-renewable energy source.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A mobile micro-grid system, comprising:
a container, comprising:
   a first DC power system, comprising:
      a first DC bus, delivering a first DC voltage;
      a first input port, selectively connected to a first external power source to receive electricity from the first external power source;
      a first sense circuit, connected to the first input port and provided to detect whether the first external power source is connected to the first input port and detect a voltage value of the first external power source if the first external power source is connected to the first input port;
      a first switch circuit, connected to the first DC bus and the first sense circuit;
      a first output port, selectively connected to a first external load to provide the first DC voltage to the first external load;
      a second sense circuit, connected to the first output port and provided to detect whether the first external load is connected to the first output port; and
      a second switch circuit, connected to the first DC bus and the second sense circuit;
   a second DC power system, comprising:
      a second DC bus, delivering a second DC voltage;
      a second input port, selectively connected to a second external power source to receive electricity from the second external power source;
      a third sense circuit, connected to the second input port and provided to detect whether the second external power source is connected to the second input port and detect a voltage value of the second external power source if the second external power source is connected to the second input port;
      a third switch circuit, connected to the second DC bus and the third sense circuit;
      a second output port, selectively connected to a second external load to provide the second DC voltage to the second external load;
      a fourth sense circuit, connected to the second output port and provided to detect whether the second external load is connected to the second output port;
      a fourth switch circuit, connected to the second DC bus and the fourth sense circuit;
      a renewable energy source, coupled to the second DC bus through a fifth switch circuit; and
      an energy storage device, coupled to the second DC bus through a sixth switch circuit;
   a three-phase AC power system, comprising:
      a three-phase AC bus, delivering a three-phase AC voltage;
      a third input port, selectively connected to a third external power source to receive electricity from the third external power source;
      a fifth sense circuit, connected to the third input port and provided to detect whether the third external power source is connected to the third input port and detect a voltage value, phase, and frequency of an AC voltage of the third external power source if the third external power source is connected to the third input port;
      a seventh switch circuit, connected to the three-phase AC bus and the fifth sense circuit;
      a third output port, selectively connected to a third external load to provide the three-phase AC voltage to the third external load;
      a sixth sense circuit, connected to the third output port and provided to detect whether the third external load is connected to the third output port; and
      an eighth switch circuit, connected to the three-phase AC bus and the sixth sense circuit;
   a single-phase AC power system, comprising:
      a single-phase AC bus, delivering a single-phase AC voltage;
      a fourth input port, selectively connected to a fourth external power source to receive electricity from the fourth external power source;
      a seventh sense circuit, connected to the fourth input port and provided to detect whether the fourth external power source is connected to the fourth input port and detect a voltage value and frequency of an AC voltage of the fourth external power source if the fourth external power source is connected to the fourth input port;
      a ninth switch circuit, connected to the single-phase AC bus and the seventh sense circuit;
      a fourth output port, selectively connected to a fourth external load to provide the single-phase AC voltage to the fourth external load;
      an eighth sense circuit, connected to the fourth output port and provided to detect whether the fourth external load is connected to the fourth output port; and
      a tenth switch circuit, connected to the single-phase AC bus and the eighth sense circuit;
   a bidirectional DC/DC converter, coupled to the first DC bus through an eleventh switch circuit, coupled to the second DC bus through a twelfth switch circuit, and provided to make the first DC bus and the second DC bus provide DC electricity to each other based on a DC voltage conversion performed by the bidirectional DC/DC converter;
   a three-phase AC/DC transformer device, coupled to the three-phase AC bus through a thirteenth switch circuit and coupled to the first DC bus through a fourteenth switch circuit;
   a first port, selectively connected to a three-phase AC grid;
   a ninth sense circuit, connected to the first port, coupled to the three-phase AC/DC transformer device through a fifteenth switch circuit, and provided to detect whether the three-phase AC grid is connected to the first port and detect a voltage value, phase, and frequency of an AC voltage of the three-phase AC grid if the three-phase AC grid is connected to the first port;
   a single-phase AC/DC transformer device, coupled to the single-phase AC bus through a sixteenth switch circuit and coupled to the second DC bus through a seventeenth switch circuit;
   a second port, selectively connected to a single-phase AC grid;
   a tenth sense circuit, connected to the second port, coupled to the single-phase AC/DC transformer device through an eighteenth switch circuit, and provided to detect whether the single-phase AC grid is connected to the second port and detect a voltage value and frequency of an AC voltage of the single-phase AC grid if the single-phase AC grid is connected to the second port; and a control circuit, coupled to the first to eighteenth switch circuits, the first to tenth sense circuits, the first DC bus, the second DC bus, the three-phase AC bus, the single-phase AC bus, the bidirectional DC/DC convertor, the three-phase AC/DC transformer device, the single-phase AC/DC transformer device, the renewable energy source, and the energy storage device;

wherein the control circuit separately receives detection results of the first to tenth sense circuits and detects voltage values of the first DC bus and the second DC bus, a voltage value, phase, and frequency of an AC voltage of the three-phase AC bus, and a voltage value and frequency of an AC voltage of the single-phase AC bus;

wherein on/off operations of the first to eighteenth switch circuits are separately controlled by the control circuit;

wherein operations of the bidirectional DC/DC convertor, the three-phase AC/DC transformer device, the single-phase AC/DC transformer device, the renewable energy source, and the energy storage device are separately controlled by the control circuit;

wherein the three-phase AC/DC transformer device makes the three-phase AC bus, the first DC bus, and the three-phase AC grid able to provide electricity to each other;

wherein the single-phase AC/DC transformer device makes the single-phase AC bus, the second DC bus, and the single-phase AC grid able to provide electricity to each other;

wherein the control circuit controls the first to eighteenth switch circuits, the bidirectional DC/DC convertor, the three-phase AC/DC transformer device, the single-phase AC/DC transformer device, and the renewable energy source to make the renewable energy source work as a primary power supply when the mobile micro-grid system provides electricity to the first external load, the second external load, the third external load, or the fourth external load.

2. The mobile micro-grid system as claimed in claim 1, wherein the second DC power system further comprises:

a fuel-battery device, coupled to the second DC bus through a nineteenth switch circuit; and a second renewable energy source, coupled to the second DC bus through a twentieth switch circuit;

wherein the first DC power system further comprises a second energy storage device coupled to the first DC bus through a twenty-first switch circuit;

wherein the nineteenth to twenty-first switch circuits are coupled to the control circuit, and on/off operations of the nineteenth to twenty-first switch circuits are separately controlled by the control circuit;

wherein the fuel-battery device, the second renewable energy source, and the second energy storage device are coupled to the control circuit, and operations of the fuel-battery device, the second renewable energy source, and the second energy storage device are separately controlled by the control circuit;

wherein the control circuit controls the first to twenty-first switch circuits, the bidirectional DC/DC convertor, the three-phase AC/DC transformer device, the single-phase AC/DC transformer device, the renewable energy source, and the second renewable energy source to make the renewable energy source and the second renewable energy source work as the primary power supply when the mobile micro-grid system provides electricity to the first external load, the second external load, the third external load, or the fourth external load;

wherein if electricity of the first DC bus is not sufficient when the mobile micro-grid system provides electricity to the first external load, the second external load, the third external load, or the fourth external load, then the control circuit turns on the twenty-first switch circuit to further make the second energy storage device provide electricity to the first DC bus;

wherein if electricity of the second DC bus received from the renewable energy source and the second renewable energy source is not sufficient when the mobile micro-grid system provides electricity to the first external load, the second external load, the third external load, or the fourth external load, then the control circuit turns on the sixth switch circuit to further make the energy storage device provide electricity to the second DC bus;

wherein if electricity of the second DC bus received from the renewable energy source, the second renewable energy source, and the energy storage device is not sufficient when the mobile micro-grid system provides electricity to the first external load, the second external load, the third external load, or the fourth external load, then the control circuit turns on the nineteenth switch circuit to further make the fuel-battery device provide electricity to the second DC bus.

3. The mobile micro-grid system as claimed in claim 2, wherein the renewable energy source is a solar energy source and the second renewable energy source is a wind power source.

4. The mobile micro-grid system as claimed in claim 2, wherein the energy storage device and the second energy storage device store electricity from the renewable energy source and the second renewable energy source while the mobile micro-grid system is not outputting electricity.

5. The mobile micro-grid system as claimed in claim 2, wherein if one external power source of the first external power source, the second external power source, the third external power source, and the fourth external power source is a renewable-energy-type power source and is connected to the mobile micro-grid system, then the control circuit controls the first to twenty-first switch circuits, the bidirectional DC/DC convertor, the three-phase AC/DC transformer device, and the single-phase AC/DC transformer device to make the external power source, the renewable energy source, and the second renewable energy source work as the primary power supply.

6. The mobile micro-grid system as claimed in claim 2, wherein if one external power source of the first external power source, the second external power source, the third external power source, and the fourth external power source is not a renewable-energy-type power source and is connected to the mobile micro-grid system, then the control circuit controls the first to twenty-first switch circuits, the bidirectional DC/DC convertor, the three-phase AC/DC transformer device, and the single-phase AC/DC transformer device to make the external power source provide electricity to the first external load, the second external load, the third external load, or the fourth external load only when the nineteenth switch circuit is turned on.

7. The mobile micro-grid system as claimed in claim 5, wherein in cases where the mobile micro-grid system is connected to the three-phase AC grid, if electricity of the second DC bus is not sufficient when the second DC bus receives electricity from the renewable energy source, the second renewable energy source, the energy storage device, the fuel-battery device, and the external power source, then the control circuit controls the first to twenty-first switch circuits, the bidirectional DC/DC convertor, the three-phase AC/DC transformer device, and the single-phase AC/DC transformer device to further make the three-phase AC grid provide electricity to the first external load, the second external load, the third external load, or the fourth external load;

wherein in cases where the mobile micro-grid system is connected to the single-phase AC grid, if electricity of the second DC bus is not sufficient when the second DC bus receives electricity from the renewable energy source, the second renewable energy source, the energy storage device, the fuel-battery device, and the external power source, then the control circuit controls the first to twenty-first switch circuits, the bidirectional DC/DC convertor, the three-phase AC/DC transformer device, and the single-phase AC/DC transformer device to further make the single-phase AC grid provide electricity to the first external load, the second external load, the third external load, or the fourth external load.

8. The mobile micro-grid system as claimed in claim 6, wherein in cases where the mobile micro-grid system is connected to the three-phase AC grid, if electricity of the second DC bus is not sufficient when the second DC bus receives electricity from the renewable energy source, the second renewable energy source, the energy storage device, the fuel-battery device, and the external power source, then the control circuit controls the first to twenty-first switch circuits, the bidirectional DC/DC convertor, the three-phase AC/DC transformer device, and the single-phase AC/DC transformer device to further make the three-phase AC grid provide electricity to the first external load, the second external load, the third external load, or the fourth external load;

wherein in cases where the mobile micro-grid system is connected to the single-phase AC grid, if electricity of the second DC bus is not sufficient when the second DC bus receives electricity from the renewable energy source, the second renewable energy source, the energy storage device, the fuel-battery device, and the external power source, then the control circuit controls the first to twenty-first switch circuits, the bidirectional DC/DC convertor, the three-phase AC/DC transformer device, and the single-phase AC/DC transformer device to further make the single-phase AC grid provide electricity to the first external load, the second external load, the third external load, or the fourth external load.

9. The mobile micro-grid system as claimed in claim 1, wherein the first DC power system further comprises:
a third renewable energy source, coupled to the first DC bus through a twenty-second switch circuit; and
a second energy storage device, coupled to the first DC bus through a twenty-first switch circuit;
wherein the twenty-first to twenty-second switch circuits are coupled to the control circuit, and on/off operations of the twenty-first to twenty-second switch circuits are separately controlled by the control circuit;
wherein the third renewable energy source and the second energy storage device are coupled to the control circuit, and operations of the third renewable energy source and the second energy storage device are separately controlled by the control circuit;
wherein the control circuit controls the first to eighteenth switch circuits, the twenty-first to twenty-second switch circuits, the bidirectional DC/DC convertor, the three-phase AC/DC transformer device, the single-phase AC/DC transformer device, the renewable energy source, and the third renewable energy source to make the renewable energy source and the third renewable energy source work as the primary power supply when the mobile micro-grid system provides electricity to the first external load, the second external load, the third external load, or the fourth external load;
wherein in cases where the mobile micro-grid system provides electricity to the first external load, the second external load, the third external load, or the fourth external load, if electricity of the first DC bus is not sufficient when the first DC bus receives electricity from the third renewable energy source, then the control circuit turns on the twenty-first switch circuit to further make the second energy storage device provide electricity to the first DC bus.

10. The mobile micro-grid system as claimed in claim 2, wherein the energy storage device or the second energy storage device is a lead-acid battery, a lithium-iron battery, or a graphene battery.

11. The mobile micro-grid system as claimed in claim 9, wherein the energy storage device or the second energy storage device is a lead-acid battery, a lithium-iron battery, or a graphene battery.

* * * * *